US007370129B2

(12) United States Patent
Green et al.

(10) Patent No.: US 7,370,129 B2
(45) Date of Patent: May 6, 2008

(54) RETRY STRATEGIES FOR USE IN A STREAMING ENVIRONMENT

(75) Inventors: Dustin L. Green, Redmond, WA (US); Michael D. Dodd, Mountain View, CA (US); David C. Clifford, Santa Clara, CA (US); Geoffrey R. Smith, Mountain View, CA (US); Peter T. Barrett, San Francisco, CA (US); Grant D. Mohr, Burlingame, CA (US)

(73) Assignee: Microsoft Corporation, Redmond, WA (US)

( * ) Notice: Subject to any disclaimer, the term of this patent is extended or adjusted under 35 U.S.C. 154(b) by 66 days.

(21) Appl. No.: 11/012,891

(22) Filed: Dec. 15, 2004

(65) Prior Publication Data

US 2006/0129723 A1 Jun. 15, 2006

(51) Int. Cl.
*G06F 13/00* (2006.01)
(52) U.S. Cl. .......................... 710/110; 710/30
(58) Field of Classification Search ............ 710/106, 710/110, 17, 29, 30; 709/231, 232, 236; 714/748, 749
See application file for complete search history.

(56) References Cited

U.S. PATENT DOCUMENTS

| | | | |
|---|---|---|---|
| 5,918,002 A * | 6/1999 | Klemets et al. ............... 714/18 |
| 6,335,933 B1 * | 1/2002 | Mallory ....................... 370/394 |
| 6,587,985 B1 * | 7/2003 | Fukushima et al. ......... 714/748 |
| 6,792,470 B2 * | 9/2004 | Hakenberg et al. ......... 709/232 |
| 6,877,038 B2 * | 4/2005 | Hakenberg et al. ......... 709/232 |
| 6,907,005 B1 * | 6/2005 | Dahlman et al. ........... 370/236 |
| 7,076,717 B2 * | 7/2006 | Grossman et al. .......... 714/748 |

OTHER PUBLICATIONS

A Packet-Loss-Recovery Scheme for Continuous-Media Streaming Over the Internet, Sze et al., IEEE Communication Letters, vol. 5, No. 3, Mar. 2003.*
Retransmission-Based Error Control for Continuous Media Applications, Papadopoulos et al., Washington University, 1996.*
"Transmission Control Protocol," from Wikipedia, the free encyclopedia, available at <<http://en.wikipedia.org/wiki/Transmission_Control_Protocol>>, accessed on Nov. 9, 2005, 7 pages.
Apple QuickTime homepage, provided by Apple of Apple, Cupertino, CA, available at <<http://www.apple.com/quicktime/mac.html>>, accessed on Nov. 9, 2005, 1 page.
"An Introduction to QuickTime," available at <<http://developer.apple.com/quicktime/qttutorial/streaming.html>>, accessed on Nov. 9, 2005, 4 pages.

(Continued)

*Primary Examiner*—Khanh Dang
(74) *Attorney, Agent, or Firm*—Lee & Hayes, PLLC

(57) ABSTRACT

Strategies are described for performing retry analysis in an environment which involves the transmission of media information from a source module to a target module. In the context of the source module, the retry analysis determines whether the source module should satisfy the retry requests issued by the target module. In the context of the target module, the retry analysis determines whether the target module should generate the retry requests in the first place. Novel request reporting formats are also described. The target module performs analysis to determine what reporting format it should use to convey the retry requests to the source module.

18 Claims, 11 Drawing Sheets

OTHER PUBLICATIONS

"QuickTime Streaming" introductory page, available at <<http://developer.apple.com/documentation/quicktime/REF/Streaming.htm>>, accessed on Nov. 9, 2005, 2 pages.

U.S. Appl. No. 11/256,222, filed Oct. 21, 2005, Thukral, entitled "Strategies for Disseminating Media Information Using Redundant Network Streams."

* cited by examiner

Example #1

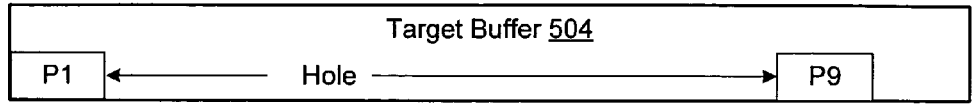

Format 1 generates one request:
[last arrived: 1
 last non-present: 8
 data rate: 150kbps
]

Format 2 generates one request:
[last arrived: 1
 length: 7
 bit mask: 0 0 0 0 0 0 0
 data rate: 150kbps
]

Example #2

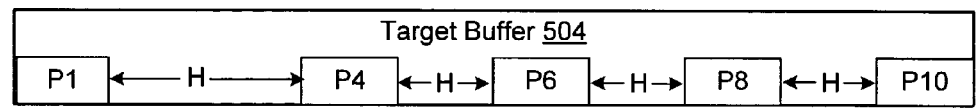

Format 1 generates 4 requests:
[last arrived: 1
 last non-present: 3
 data rate: 150kbps
]
[last arrived: 4
 last non-present: 5
 data rate: 150kbps
]
[last arrived: 6
 last non-present: 7
 data rate: 150kbps
]
[last arrived: 8
 last non-present: 9
 data rate: 150kbps
]

Format 2 generates one request:
[last arrived: 1
 length: 8
 bit mask: 0 0 1 0 1 0 1 0
 data rate: 150kbps
]

Fig. 6

RETRY STRATEGIES FOR USE IN A STREAMING ENVIRONMENT

TECHNICAL FIELD

This subject matter relates to strategies for streaming resource information from a source module to a target module, including strategies for resending one or more packets of the resource information in response to requests from the target module.

BACKGROUND

Traditional broadcast systems typically deliver media information in a one-way fashion, from a source module to a target module. The target module typically comprises a conventional television set or one-way set-top box, which may receive analog or digital signaling. As such, the communication channel that couples the source module to the target module typically does not provide any mechanism for allowing the target module to alert the source module when it has failed to receive one or more parts of the media information. This does not present many difficulties, however, as the communication channel in traditional systems typically uses analog delivery (in which small amounts of missing information may not appreciably degrade the quality of the presentation) and/or proprietary infrastructure (which is typically designed to deliver the media information in a reliable manner).

Systems which use public networks to transmit information do not afford the same level of reliability, and, as such, commonly include mechanisms for addressing problems that are encountered in sending information from a source module to a target module. For instance, public WAN networks commonly use the Transmission Control Protocol (TCP) to ensure the reliable delivery of information from a source module to a target module (where the target module typically comprises some type of computer device coupled to the public network). This protocol sends information to the target module in chunks. The target module, upon successful receipt of information, sends an acknowledgement message back to the source module, providing information regarding the last portion of the information that it has successfully received, and a window size specifying how much more information the sender may send beyond the last acknowledged information. If the source module does not receive the acknowledgement message in a predetermined time, then it will assume that the information has been lost. The source module will then retransmit the information to the target module. The TCP protocol will dynamically change the size of the window to match the prevailing conditions in the public network, increasing the amount of information specified by the window when conditions are assessed as good (that is, as favoring reliable communication).

The above strategy works well for the transmission of non-time-critical information (such as E-mail messages and web pages), but does not provide a suitable solution for the streaming of media information. Namely, in streaming applications, the target module must receive a continuous stream of media information according to a defined demand schedule; if it does not, the target module's decoder will consume information with "holes" in it before the network has an opportunity to fill in such holes. This will lead to various artifacts in the media playback, or, in extreme cases, can lead to the stream being completely disabled (e.g., "dropped"). This type of shortcoming does not suggest a flaw in TCP, however, as this protocol was designed to deliver information over a public network in a manner that is fair to multiple competing applications that happen to be active at the same time; it was not designed to ensure that a particular target module is always supplied with a minimum amount of streaming media information. Generally, the loss of information in a digital stream is often more distracting to a user than the loss of information in traditional analog delivery, as such loss can manifest itself in abrupt interruptions in the presentation in which the presentation is entirely disabled during the interruptions.

Therefore, practitioners in the art often resort to other techniques to ensure the reliable delivery of media information over networks. FIG. 1 illustrates one exemplary solution envisioned by the present inventors. As indicated in this system 100, a source module 102 sends a stream of media information 104 over a communication channel 108 to a target module 108. In this solution, the target module 108 determines whether it has received each packet in the stream of media information 104. The target module 108 may "miss" a packet because the packet has been lost during transit or because the packet has been received but it has been corrupted (and is therefore unusable). If the target module 108 determines that it has missed a packet, it can immediately send a retry message 110 to the source module 102. The retry message asks the source module 102 to supply the missing packet. The source module 102 honors this request (if it can) by sending the missing packet to the target module 108.

This solution does not provide satisfactory results in all circumstances. Due to the nature of packet-based networks, packets are not guaranteed to be received by the target module 108 in order. As such, a missing packet may not have been entirely lost, but may be simply delayed in reaching the target module 108. As such, it may happen that the target module 108 sends a retry request 110 for a packet that arrives shortly thereafter. In another case, the target module 108 may come to the conclusion that a prior retry request has been lost when it does not receive a response to the retry request from the source module 102. But the source module 102 may indeed have received this prior retry request and is in the process of responding to it. Both scenarios may result in the target module 108 receiving duplicate packets in the stream of media information 104.

This problem may not seem of great concern for the isolated scenarios described above. But in certain circumstances, the unnecessary transmission of packets in the system 100 can escalate to a phenomenon known as a packet storm. This scenario plays out as follows. The target module 108 may determine that many packets are missing, upon which it issues a corresponding number of retry requests to the source module 102. The source module 102 then provides the missing packets to the target module 108. However, many communication channels 106 have prescribed limitations on the amount of bandwidth devoted to handling communication between the source module 102 and the target module 108; this allotted bandwidth must handle both the stream 104 and the retry requests 110, as well as the transmission of retry packets from the source module 1102 to the target module 108 in response to the retry requests 110. It may happen that the transmission of retry packets from the source module 102 to the target module 108 begins to overburden the capacity of the communication channel 106. Forcing too much information through the communication channel, in turn, will result in the potential loss of more packets in the stream 104. These missed packets, in turn, can lead to additional retry requests, additional retry packets, further consumption of bandwidth resources, and the loss of yet more packets. It can be seen that this phenomenon (the packet storm) describes a deleterious feedback loop that can lead to very poor performance, and possibly the complete disablement of the stream 104. As appreciated by the present inventors, key to the source of this problem is the transmission of redundant (or otherwise inappropriate) retry requests from the target module 108 to the source module 102, and the transmission of redundant (or otherwise inappropriate) retry packets from the source module 102 to the target module 108.

For at least the above-identified exemplary reasons, there is a need for more effective and efficient strategies for streaming media information from a source module to a target module.

SUMMARY

According to one exemplary implementation, a method is described for streaming resource information from a source module to a target module. The method comprises: (a) sending a stream of resource information from the source module to the target module; (b) receiving a retry request from the target module which indicates that the target module has failed to receive at least one packet within the stream of resource information; (c) applying retry analysis to determine whether to send the target module the above-mentioned at least one missing packet in response to the retry request, wherein the retry analysis determines whether to send the above-mentioned at least one missing packet based on an assessment of the level of appropriateness associated with the retry request; and (d) sending the target module the above-mentioned at least one missing packet if the retry analysis confirms that the above-mentioned at least one missing packet should be sent.

According to another exemplary implementation, another method is described for receiving streaming resource information by a target module from a source module. The method comprises: (a) receiving a stream of resource information by the target module; (b) determining whether at least one of packet within the stream of resource information is missing; (c) applying retry analysis to determine whether to send a retry request to the source module to request the source module to send the above-mentioned at least one missing packet, wherein the retry analysis determines whether to send the retry request based on an assessment of the level of appropriateness associated with the retry request; and (d) sending the source module the retry request if the retry analysis confirms that the retry request should be sent.

Additional exemplary implementations are described in the following.

BRIEF DESCRIPTION OF THE DRAWINGS

FIG. 6 shows two exemplary reporting formats that can be used to communicate retry requests from the target module to the source module of FIG. 2.

Figure 1:
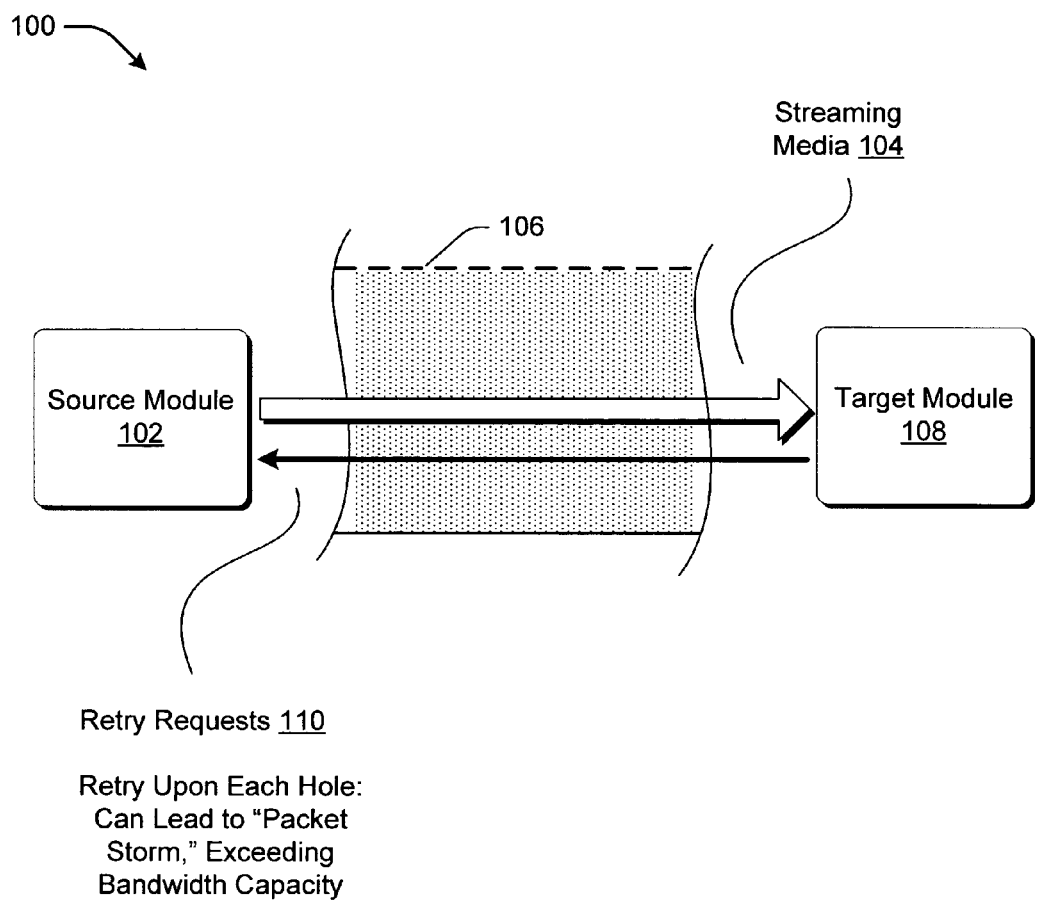
FIG. 1 shows a strategy for handling lost packets by sending a retry request for each respective lost packet.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for performing intelligent retry analysis to govern retry behavior in a system which uses a source module (e.g., a server module) to transmit a stream of resource information (e.g., media information) to a target module (e.g., a client module).

A first part of the retry analysis takes place at the source module. In this part, the source module uses the retry analysis to determine whether it should send one or more retry packets to the target module upon request. The retry analysis can base its decision on one or more factors, including any combination of the following exemplary and non-limiting set of factors:

(s.a) Is the requested packet stored in the source module's buffer? The retry analysis performed by the source module determines whether the buffer of the source module still contains the requested packet. If the buffer no longer contains the packet, then the retry analysis determines that the retry request is inappropriate and it will not honor the request.

(s.b) Is the requested packet already queued to be sent by the source module? The retry analysis performed by the source module determines whether the source module (or some other entity) has already queued the requested packet for transmission to the target module (or is otherwise already "planning" to send the missing packet to the target module). If so, then the retry analysis determines that the retry request is inappropriate and it will not honor the request.

(s.c) Has the requested packet recently been transmitted by the source module? The retry analysis performed by the source module determines whether the source module (or some other entity) has recently transmitted the requested packet to the target module (e.g., using unicast delivery, multicast repeater-type delivery, or some other kind of delivery). If so, then the retry analysis determines that the retry request is inappropriate and it will not honor the request.

(s.d) Can the requested packet be delivered to the target module on time? The retry analysis performed by the source module determines whether the source module can transmit the requested packet to the target module by a time that the target module is scheduled to perform some action on the requested packet. If not, then the retry analysis determines that the retry request is inappropriate and it will not honor the request.

(s.e) Can the requested packet be delivered to the target module without exceeding prescribed bandwidth limitations? As a subpart of factor (s.d), the retry analysis performed by the source module can determine whether the source module can transmit the requested packet to the target module in a manner which does not exceed bandwidth limitations associated with a communication channel which couples the source module to the target module. In other words, the source module knows that it has to deliver a certain quantity of resource information over a communication channel having prescribed limitations. This factor determines whether it is possible to transmit the resource information to the target module without exceeding those limitations. If this is not possible, then the retry analysis determines that the retry request is inappropriate and it will not honor the request. The source module can obtain information regarding such prescribed bandwidth limitations using various techniques. In one technique, the source module can perform bandwidth analysis based on information previously transmitted to it by the target module. The target module, in turn, can discover these limitations by determining the behavior of the communication channel at different data rates. Or the communication channel may be pre-provisioned to operate within prescribed limitations, and information regarding these limitations can be supplied to the source module in advance. Generally, in a constant bit rate environment, factor (s.d) can be proactively determined (in advance of sending the packet) because the amount of available bandwidth remains constant. In an environment with variable bandwidth limitations, it may not be possible to determine the answer to (s.d) until a packet is already late, at which point the retry can be discarded if it is still pending.

A second part of the retry analysis takes place at the target module. In this part, the target module uses the retry analysis to determine whether it should send one or more retry requests to the source module in response to detecting missing packets in the stream of resource information. The retry analysis can base its decision on one or more factors, including any combination of the following exemplary and non-limiting set of factors:

(t.a) Has there been a predetermined period of time since a prior retry request? The retry analysis performed by the target module determines whether there has been a predetermined time since a prior retry request. This can be assessed by determining whether a retry timer has expired. If the predetermined time has not yet expired, then the retry analysis determines that the retry request is inappropriate and it will not send the request (yet).

(t.b) Has the source module recently sent a response to a prior retry request? The retry analysis performed by the target module determines whether the source module has recently responded to a prior retry request. If a response has recently been received, then the retry analysis determines that a new retry request is inappropriate and it will not send the new request. More specifically, the target module can be configured to reset the above-identified retry timer upon receipt of a response to a prior retry request from the source module; this will have the effect of delaying the transmission of the new retry request to source module (or possibly removing the retry request altogether, if it happens that the delaying tactic allows the target module to receive the packets that it needs without having to ask for them).

Figure 10:
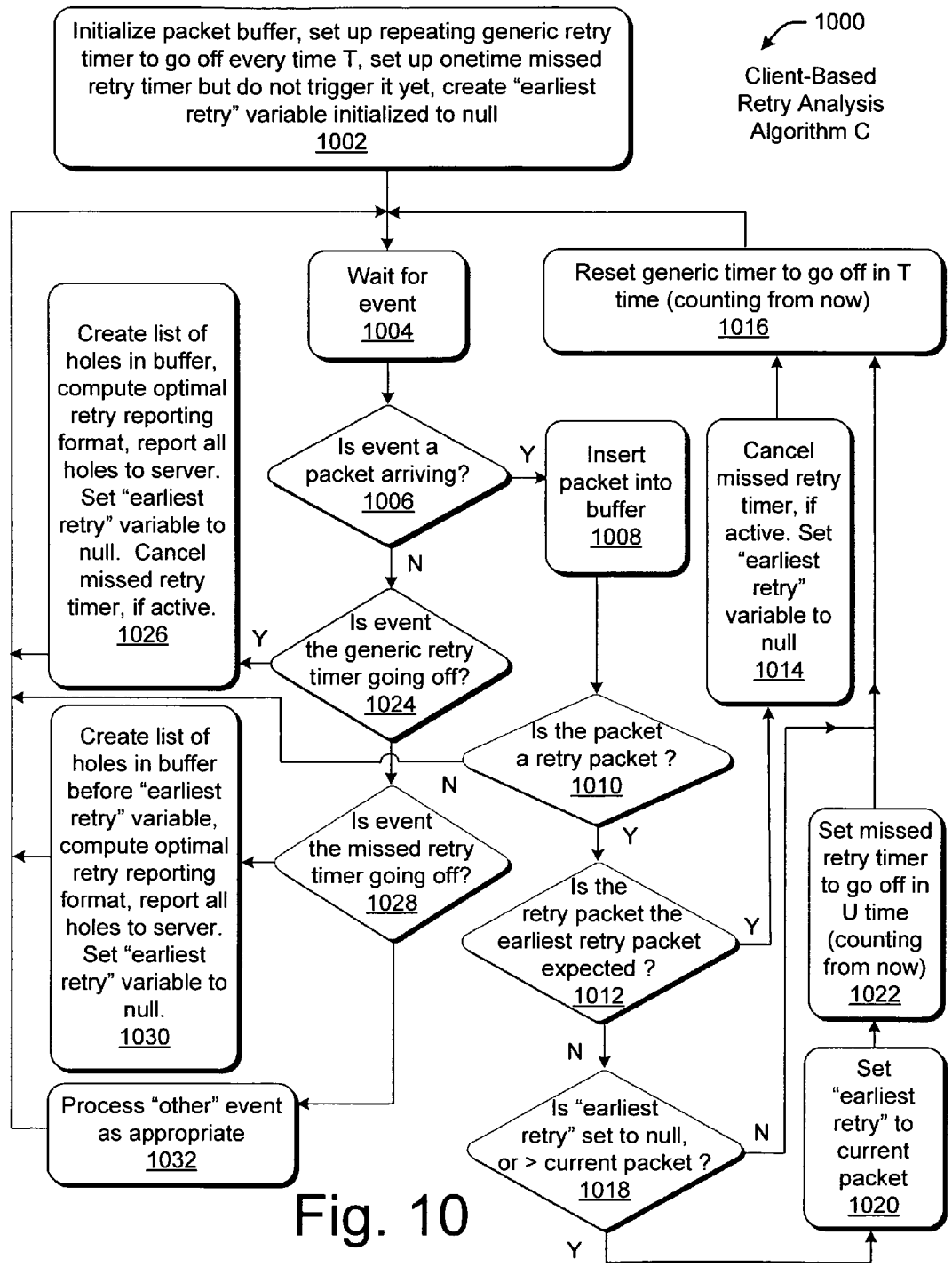
FIG. 10 shows yet another exemplary procedure that can be used by the target module of FIG. 5 to implement retry analysis.

(t.c) Has the target module received a packet in response to a retry request that does not pertain to an earliest identified lost packet, without then timely receiving a yet earlier lost packet? In one exemplary implementation, this query can be formulated as: Has a predetermined amount of time elapsed since receiving a response to a prior retry request from the source module that pertains to a lost packet which is not the earliest identified lost packet and which is the earliest lost packet received since last requesting any retries or receiving an earliest identified lost packet? Namely, in this implementation, the retry analysis performed by the target module determines whether a predetermined amount of time has elapsed since receiving a response to a prior retry request that pertains to a lost packet which is the earliest packet received during the predetermined amount of time, but the lost packet is not the earliest packet that has been identified as being lost. If this is the case, then the retry analysis determines that the retry request is appropriate at least for any lost packets that occur before the earliest packet received during the predetermined amount of time. FIG. 10 describes one exemplary implementation of this factor, which will serve to clarify the above description. As will be discussed in connection with that figure, the target module can implement this feature using two timers.

(t.d) Has the source module previously indicated that it will not supply the lost packet? The retry analysis performed by the target module determines whether the source module has previously indicated that it will not supply the lost packet. If this is the case, then the retry analysis determines that the retry request is inappropriate and it will not send the request.

(t.e) Can the source module deliver the lost packet in time? The retry analysis performed by the target module determines whether the source module can possibly deliver the lost packet by a time that the target module is scheduled to perform some action of the lost packet. If this is not the case, then the retry analysis determines that the retry request is inappropriate and it will not send the request.

As a further feature, the target module can express the retry request in different possible formats. The retry analysis performed by the target module can further determine which one of the formats to use to send the retry request to the source module, e.g., based on efficiency, bandwidth limitations, and/or any other factor(s). In general, one or more adjacent lost packets define a "hole" in the stream of resource information. One exemplary reporting format describes this hole by providing information which identifies the start and end of the hole. Another exemplary reporting format defines one or more holes by providing information which identifies one boundary of a first hole in combination with a mask of defined size which describes missing packets that make up subsequent holes that are within the mask size of the first hole.

The strategies described herein confer a number of benefits. According to one benefit, employing judicious analysis to determine when to generate retry requests (at the target module) and when to honor retry requests (at the source module) helps eliminate the amount of redundant (e.g., unnecessary) or otherwise inappropriate retry behavior. This, in turn, reduces the amount of wasteful bandwidth used by the retry behavior, which, in turn, can help reduce degradation in the presentation of the resource information.

The retry analysis can specifically help reduce the chances of the packet storm phenomenon described in connection with FIG. 1.

Additional features and attendant benefits of the strategies will be set forth below.

As to terminology, the term "resource information" refers to any data represented in electronic form that can be consumed by a user. The resource information may include, or may omit, interactive content. A specific class of resource information may pertain to media information. The media information can include any information that conveys audio and/or video information, such as audio resources (e.g., music, etc.), still picture resources (e.g., digital photographs, etc.), moving picture resources (e.g., audio-visual television programs, movies, etc.), computer programs (e.g., games, etc.), and so on.

The term "stream" refers to the representation of the resource information as a time-sequenced flow of the resource information. A target module can consume a stream of resource information in piecemeal fashion as it is received, as opposed to requiring the target module to receive the entire body of the entire contents of the resource information (e.g., as a single file) before consuming the resource information.

The term "communication channel" broadly refers to the resources that a system uses for handling communication between a particular source module and a particular target module.

The term "lost packet" or "missed packet" refers to a packet that a target module has either entirely failed to receive, or a packet that the target module has received but that is corrupted. For example, if error correcting codes are used, a corrupted packet comprises a packet which has too many errors for successful recovery.

This disclosure includes the following sections. Section A presents exemplary systems for implementing intelligent retry analysis. Section B presents a series of flowcharts which describe the operation of the system of Section A. Section C describes an exemplary computer environment for implementing aspects of the system of Section A.

A. Exemplary System

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of an Exemplary System for Performing Retry Analysis

Figure 2:
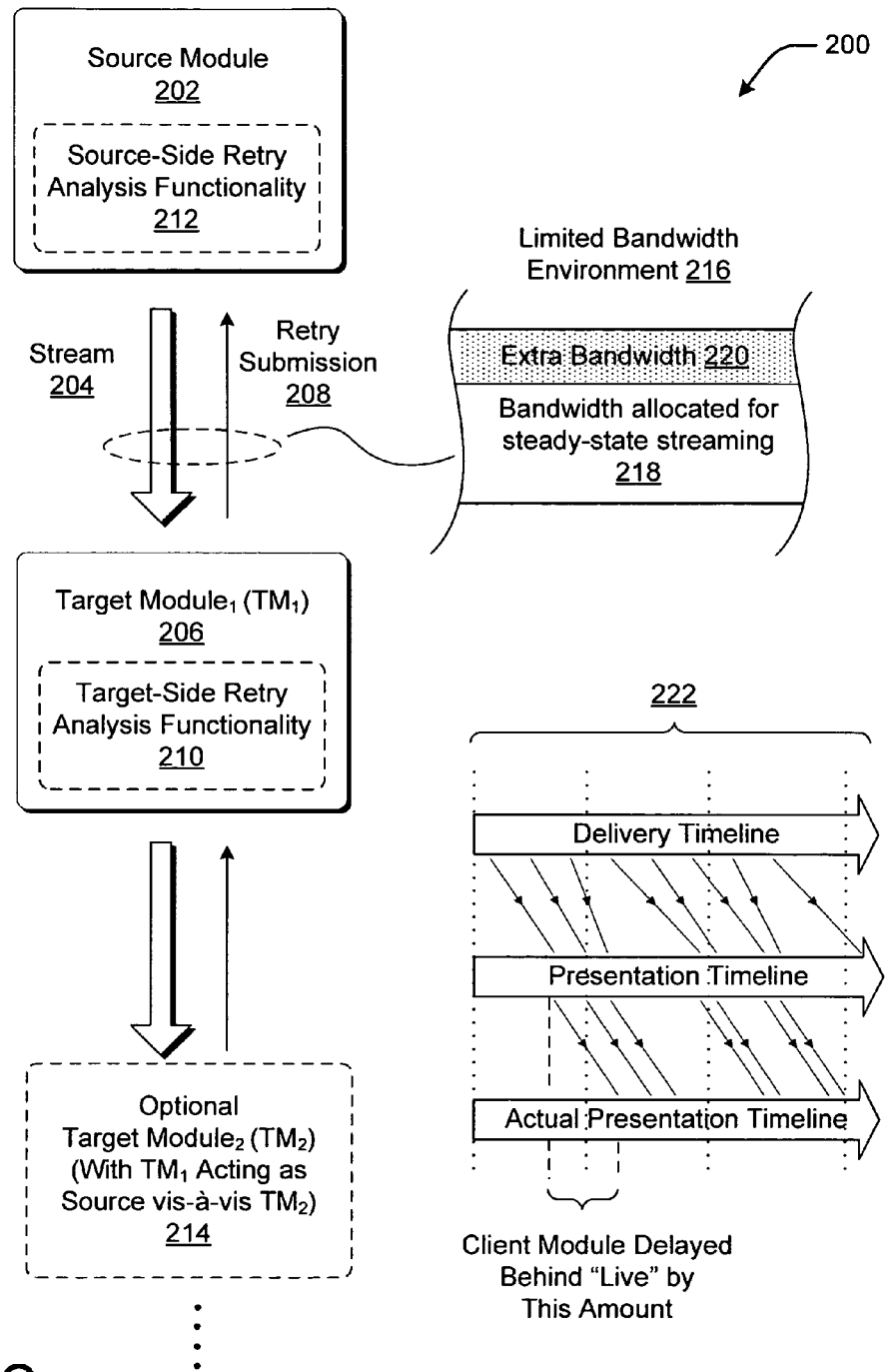
FIG. 2 shows an exemplary system for streaming resource information from a source module to a target module using retry analysis to assess the appropriateness of various retry behavior.

FIG. 2 shows an exemplary system 200 that can be used to implement intelligent retry analysis. The system 200 includes source module 202 which forwards a stream of resource information 204 to a target module 206. The target module 206 can send one or more retry requests 208 to the source module 202, which alert the source module 202 to the presence of "holes" in the received stream of resource information 204. The source module 202 responds by sending the missing packets in the stream of resource information 204. The target module 206 includes target-side retry analysis functionality 210 for determining whether it is appropriate to send a retry request 208 to the source module 202. The source module 202 includes counterpart source-side retry analysis functionality 212 for determining whether it is appropriate to honor the retry request by sending a retry packet in the stream of resource information 204.

The above-described functionality plays out in the context of a single pair of modules: the source module 202 and the target module 206. The source module 202 may represent the ultimate source of resource information and the target module 206 may represent the ultimate destination (e.g., the ultimate consumer) of the resource information. However, the same strategy can be employed anywhere an entity streams resource information to a recipient entity, regardless of where these modules are positioned within a more encompassing chain of modules involved in the distribution. Consider the case of FIG. 2, for instance, which shows that the target module 206 acts a source module vis-à-vis another target module 214. The same kind of source and target analysis functionality can be employed to facilitate the streaming of resource information from module 206 to module 214. In other words, retry analysis can be applied at multiple locations along the chain of participants involved in the distribution of the stream of resource information. To simplify the discussion, however, the following discussion will focus on a single source module/target module pair, such as source module 202 and target module 206. Subsection A.4 describes a variation which takes into account additional entities in a distribution chain used to deliver resource information.

To begin with, FIG. 2 shows a graphical depiction of a communication channel 216 used by the source module 202 and the target module 206 to exchange information with each other. The communication channel 216 generally refers to any resources that the system 200 allocates to handling this exchange of information. The system 200 may place certain limitations on the bandwidth of this communication channel 216, making the system 200 a rate-limited environment, as this term is used herein. Namely, the channel 216 may devote a certain amount of bandwidth 218 to transmitting the stream of resource information 204 under normal conditions. The normal conditions may describe the steady-state conditions in which the stream of resource information 204 is supplied to the target module 206 in order to ensure that the target module 206 does not run out of resource information (e.g., does not enter a state of underflow). In one exemplary implementation, the channel 216 can also devote extra bandwidth 220 for handling the retry requests 208 (among other potential uses). (However, as will be discussed, other arrangements are possible for handling retry requests.)

In one exemplary case, the system 200 may be pre-provisioned to allocate a certain amount of extra bandwidth 220 (e.g., based on any combination of technical and/or business-related factors) to the communication channel 216. For example, the system 200 may allocate 30 percent of extra bandwidth (relative to the nominal bandwidth 218 of the stream 204) to handling retry requests 208 (among other potential uses). The term "nominal" refers to the maximum allowable steady-state bandwidth the stream is designed to fit within.

Alternatively, any component within the system 200 may dynamically determine the amount of extra bandwidth 220 that the communication channel 216 will accommodate. In one case, the target module 206 can make this determination by instructing the source module 202 to send the stream 204 at different data rates. As the data rate increases, the target module 206 will begin to notice degradation in the stream 204, as reflected by an increasing number of packets that are lost. The target module 206 can use this iterative procedure to assess the extra bandwidth 220 by determining a level at which the quality of the stream 204 is acceptable, but beyond which it becomes unacceptable. The target module 206 can make this assessment periodically. The target module 206 can also forward information regarding the excess bandwidth 220 to the source module 202. For instance, the target module 206 can package such rate information into the information that it sends the source module in its retry requests 208. The source module 202 can then use this rate information as one factor in determining whether it is appropriate to send the requested lost packet(s).

The communication channel 216 shown in FIG. 2 corresponds to the delivery of resource information using a constant bit rate. However, the communication channel 216 may alternatively deliver resource information using a variable bit rate. The variable bit rate can be capped by a maximum permissible bandwidth.

Finally, FIG. 2 shows a series of timelines 222 that illustrate the manner in which the target module 206 consumes resource information (in the event that the target module 206 is the final recipient of the stream 204). Consider the case of video information. Many protocols tag video information using two separate time stamps: a delivery timestamp and a presentation timestamp. A delivery timestamp associated with a packet describes when that packet is intended to be delivered to a receiver. The presentation timestamp describes when the decoded version of that packet should actually end up on a presentation device used to output the resource information.

A series of delivery timestamps defines a delivery timeline. The first timeline in the group of timelines 222 shows a delivery timeline. A series of presentation timestamps defines a presentation timeline. The second timeline in the group of timelines 222 shows a presentation timeline. The arrows connecting the delivery timeline and the presentation timeline illustrate how video information in the delivery timeline corresponds to the same video information in the presentation timeline (where the video information in the presentation timeline reflects a series of video frames produced by decoding the delivered packets, and where each video frame is generated based on one or more packets). The arrows are skewed because the video information is intended to be presented some time after their respective delivery times. FIG. 2 also shows that the video information is evenly spaced on the delivery timeline, but is bunched up on the presentation timeline. This is because video information can, in one exemplary environment, be delivered at a constant rate, but the video information is not consumed at a constant rate (e.g., because the video information may include frames having different sizes, as will be discussed, but which are presented on a display for the same amount of time). (Analysis for constant bit rate also applies to worst-case assumptions for capped variable bit rate, where the resource information is delivered at the maximum levels permitted).

The group of timelines 222 also shows a third timeline that describes when the video information is actually presented (as opposed to when it was intended to be presented). The arrows connecting the presentation timeline and the actual timeline illustrate how video information in the presentation timeline corresponds to the same video information in the actual timeline. The arrows are skewed because the video information is actually presented some time after it was intended to be presented. Namely, as will be described, the source module 202 uses a buffer to store the video information prior to sending it to an output device (such as a television screen or computer monitor). This buffer imposes a delay in the presentation of the video information (because there will typically be some amount of time between when the packet is placed in the buffer and when it is actually output to the presentation device). Different target modules may have different mechanisms (e.g., buffer capacities) for delaying the presentation of the video information; hence, different target modules may follow different respective actual presentation timelines. Other reasons that the client modules may have different actual presentation timelines include: (a) client modules tuning to the stream at slightly different times; and (b) client modules requiring different amounts of delay relative to a live state for smooth playback, depending on the loss rate of the channel.

Figure 3:
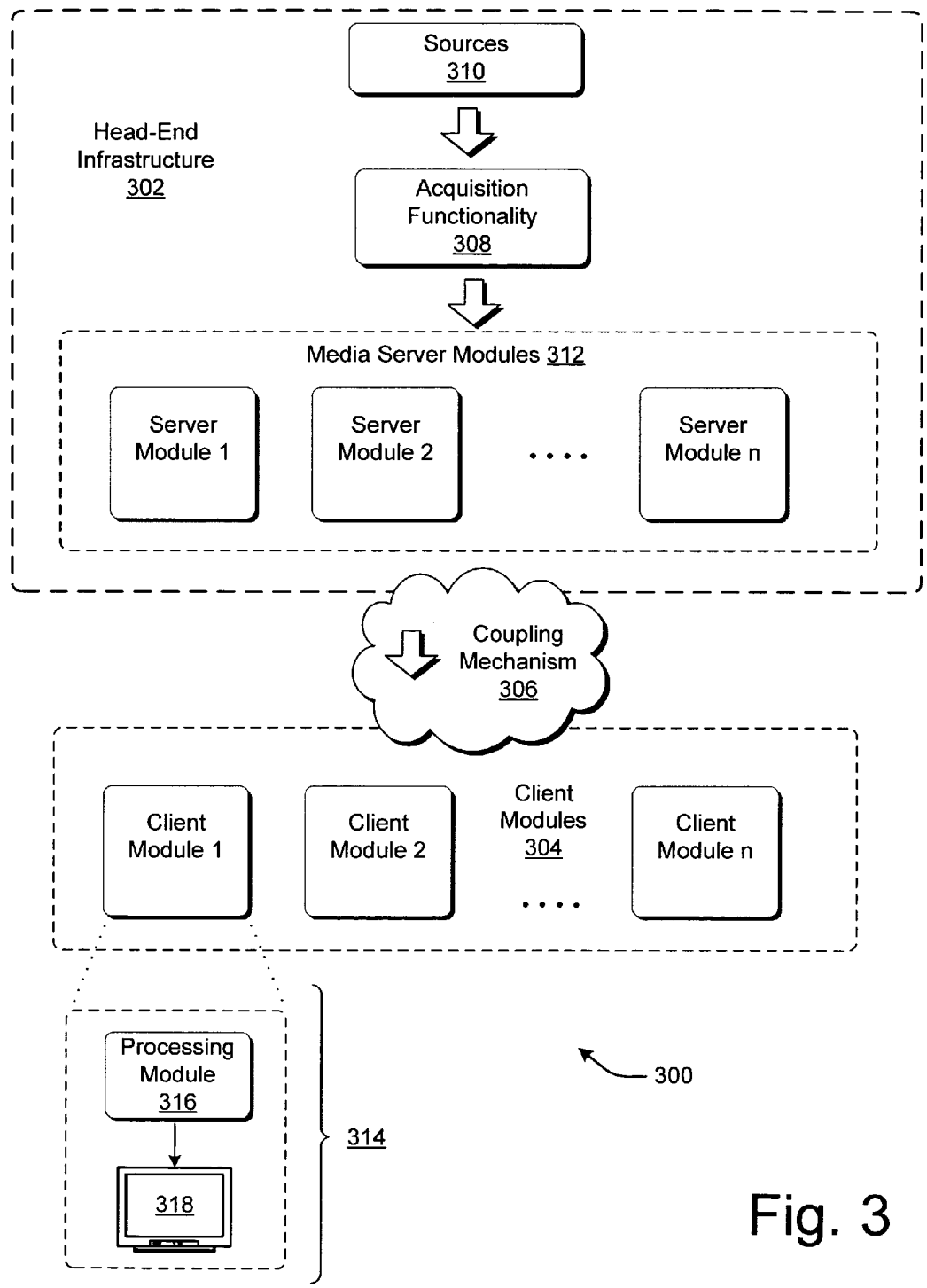
FIG. 3 shows one exemplary implementation of the system of FIG. 2 in an environment devoted to streaming media information to a plurality of client modules.

Advancing to FIG. 3, this figure shows one exemplary system 300 among many possible systems that can utilize the retry analysis introduced in the context of FIG. 2. By way of overview, the system 300 defines head-end infrastructure 302 for delivering streams of resource information to a collection of client modules 304 via a coupling mechanism 306.

The head-end infrastructure 302 includes acquisition functionality 308 for supplying the resource information from one or more sources 310 of such information. The sources 310 can represent any kind of entity which produces or provides information, such as conventional cable or satellite television providers, one or more Video-On-Demand (VOD) suppliers of information, one or more publishing houses of information, one or more library sources of information, any kind of Internet-enabled repository of information, and so on. In general, the sources 310 can supply live information or prerecorded information. Live information corresponds to information that captures a current state of an ongoing event (such as a sporting event which is being televised live). Prerecorded information corresponds to information that has already been recorded in its entirety. The acquisition functionality 308 itself can comprise one or more server computers or other functionality dedicated to the task of retrieving the resource information and (optionally) storing the resource information prior to dissemination to the client modules 304.

The system 200 can use any kind of coupling mechanism 306 to couple the head-end functionality 202 to the client modules 304. For instance, the coupling mechanism 306 can include any kind of network (or combination of networks), such as a wide area network (e.g., the Internet), an intranet, Digital Subscriber Line (DSL) network infrastructure, point-to-point coupling infrastructure, and so on. The coupling mechanism 316 can use or involve any kind of protocol or combination of protocols, such as the Internet Protocol (IP), the Transmission Control Protocol (TCP), the User Datagram Protocol (UDP), the HyperText Transfer Protocol (HTTP), the Simple Object Access Protocol (SOAP), the Real Time Transport Protocol (RTP), the Real Time Streaming Protocol (RTSP), the Advanced Streaming Format (ASF), and many potential others. In the case where one or more digital networks are used to disseminate information, the coupling mechanism 306 can include various hardwired and/or wireless links, routers, gateways, name servers, and so on. In the case where DSL infrastructure is used to disseminate information, the coupling mechanism 306 can utilize the services, in part, of telephone coupling infrastructure and DSL processing functionality. The retry mechanisms described herein are not technology-dependent, meaning that they these techniques can "sit on top" of different protocols and technologies, or otherwise integrate and interact with such protocols and technologies.

The system 300 can optionally use a collection of server modules 312 to facilitate the transmission of resource information to the client modules 304. The server modules 312 may provide redundant services, such that any of the server modules 312 can be assigned to provide the same service to any of the client modules 304.

Different systems may use the server modules 312 in different ways. One exemplary system may use the server modules 312 to transmit resource information received from the acquisition functionality 308 or from some other source (e.g., from a VOD source) in unicast fashion. Another exemplary system may use the server modules 312 as "multicast repeaters." A multicast repeater defines a server module whose job is repeating a reliable multicast stream downstream for the consumption of further server modules or client modules. The system may opt to use the multicast repeater setup when there are too many server modules 312 attached to a service for the acquisition functionality 308 to handle.

Another role performed by the server module is to receive retry requests from the client module and send retry packets to the client module in response to these requests. While such packets are given the special label "retry packets" herein, the server module will typically not use a special format when sending these packets; in other words, these packets are inserted into the regular stream of resource information in the manner of any other packet. This scenario corresponds to the case where the entity which sends the original packet is also the entity which fields a retry request for a missing packet (as is the case shown in FIG. 2). However, it is also possible to provide an arrangement where a first entity sends the original packet and another entity handles the retry requests; the first and second entities could communicate with each other to cooperatively perform the retry analysis described below. The term "server module" as used herein may therefore represent a cooperative multiplicity of actors, rather than a single actor.

However it is implemented, the source module can use different strategies to forward retry packets to the client modules. In one case, the source module can supply nothing but retry packets. Consider, for example, an exemplary case where the server module is used to deliver retry packets in unicast mode to a client module, while the client module receives a primary stream of resource information from a multicast source. Alternatively, the source module concurrently supplies both the primary stream of resource information as well as the retry packets; for instance, as shown in FIG. 2, the server module may allocate extra available bandwidth to provide the retry packets without impacting the ongoing streaming of resource information.

Finally, FIG. 3 shows an exemplary composition of one of the client modules 314 in the system 300. Generally, the client module 314 can include any kind of equipment for interacting with the head-end infrastructure 302. In one exemplary case, the client module 314 can correspond to set-top boxes, game-type consoles (such as Microsoft Corporation's Xbox™ game consoles), software and/or hardware functionality integrated into the associated presentation devices, general purpose or special purpose computer devices, and so forth. More specifically, FIG. 3 shows that the client module 314 comprises processing functionality 316 for processing resource information received from the head-end infrastructure 302 and presentation functionality 318 that outputs the processed resource information to a consumer. For instance, the client processing functionality 316 can correspond to a set-top box, and the presentation functionality 318 can correspond to a television unit which couples to the set-top box. Or the client processing functionality 316 can correspond to a general purpose computer and the presentation functionality 318 can correspond to a computer monitor which couples to the computer.

In the context of the system 300 shown in FIG. 3, any of the server modules 312 can act as source modules which implement the source-side retry analysis functionality 212 (introduced in FIG. 2). Any of the client modules 304 can act as target modules which implement the target-side retry analysis functionality 210 (introduced in FIG. 2). However, note that the server modules 312 also receive the resource information from the acquisition functionality 308. Hence, the acquisition functionality 308 can also implement the source-side retry analysis functionality 212, and the server modules 312, vis-à-vis the acquisition functionality 308, can also implement the target-side retry analysis functionality 210.

To repeat, the system 300 shown in FIG. 3 represents just one of many streaming environments that can use the retry analysis functionality (210, 212). Hence, the remaining discussion will revert to the more general terminology of "source module" and "target module," rather than server module and client module, respectively.

A.2. Exemplary Source Module and Target Module

Figure 4:
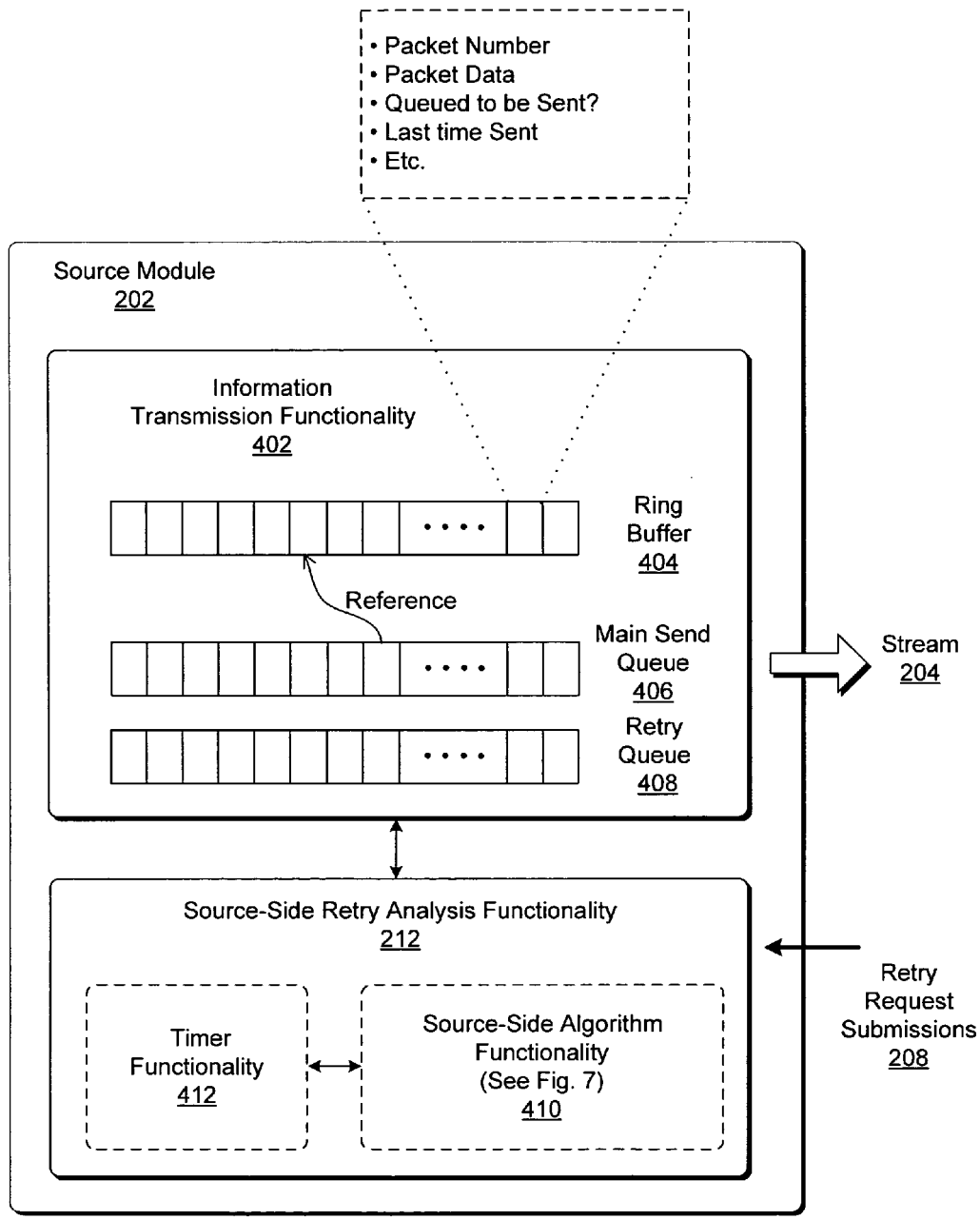
FIG. 4 shows an exemplary source module that can be used in the system of FIG. 2.

FIG. 4 shows more detail regarding the exemplary source module 202 introduced in the context of FIG. 2. The source module 202 includes information transmission functionality 402 which performs the core tasks of compiling the resource information into a plurality of packets, and then forwarding the packets as the stream 204 to the target module 206. More specifically, take the case of video information. The video information can be expressed in various formats. In one implementation, the video information can be composed of a series of key frames (also referred to as I frames, random access points, etc.) which contain complete "snapshots" of the video information at a particular juncture in time. The video information can also include a variety of delta frames (Δ) which represent the video information at different junctures by expressing how the video information differs from one or more neighboring key frames. MPEG-2, for example, uses this approach by presenting a combination of I-frames, B frames and P frames (where the I frames constitute key frames, and the B and P frames constitute difference frames). The source module 202 breaks this frame information up into a plurality of sequential packets (each having a different sequence number assigned thereto), and transmits a stream of these packets to the target module 206, which reassembles the original series of packets (and frames contained therein) in the proper order for decode and playback.

To perform the above functions, the transmission functionality 402 can include a ring buffer 404 for receiving each generated packet that should be sent to the target module 206. This buffer 404 specifically stores a packet number assigned to the packet, the contents of the packet, a "queued to be sent" flag indicating whether or not the packet needs to be sent, and, if sent, the time that the packet was sent. Initially, information transmission functionality 402 sets the "queued to be sent" flag to a "needs to be sent" status, and sets the time to 0 (corresponding to an unsent status).

The information transmission functionality 402 also includes two send queues. A main send queue 406 stores references to new packets in the ring buffer 404 that need to be sent to the target module 206. A retry queue 408 stores references to packets in the ring buffer 404 that need to be resent in response to retry requests. In operation, a send thread first reads through the retry queue 408 to determine whether any packets need to be resent. If this is not the case, the thread will read through the send queue to determine new packets to be sent. Each time the thread sends a packet out, it clears the "queued to be sent" flag in the appropriate slot of the ring buffer (corresponding to the packet that has been sent), and also sets the "last time sent" field to the current time. Note that while there are two send queues (406, 408), there is only one ring buffer 404 for a given stream.

The source module 202 also includes the source-side retry analysis functionality 212 (introduced in the context of FIG. 2). The basic purpose of the source-side retry analysis functionality 212 is to receive retry requests 208 from the target module 206, and based thereon, perform analysis to determine whether it should honor these requests. If the source-side retry analysis functionality 212 determines that it should honor these requests, it interacts with the information transmission functionality 402 to resend the packets that have been identified as lost by the retry requests.

The source-side retry functionality 212 includes source-side algorithm functionality 410 for determining whether packets should be added to the retry queue 408 in response to retry requests. The source-side algorithm functionality 410 can be implemented as hardware and/or software for performing prescribed analysis to determine whether to satisfy received retry requests. The source-side algorithm functionality 410 may interact with timer functionality 412 in performing its analysis. Later figures (e.g., FIG. 7) describe the exemplary logic used by the source-side algorithm functionality 410 in greater detail.

By way of summary, exemplary factors which can play a part in a determination of whether or not to honor the retry requests can include any combination of the following exemplary and non-limiting factors:

(Source Factor a) Is the requested packet stored in the source module's buffer? The retry analysis performed by the source-side algorithm functionality 410 determines whether the ring buffer 404 buffer of the source module 202 still contains the requested packet. If the buffer 404 no longer contains the packet, then the retry analysis determines that the retry request is inappropriate and it will not honor the request.

(Source Factor b) Is the requested packet already queued to be sent by the source module? The retry analysis performed by the source-side algorithm functionality 410 determines whether the source module 202 has already queued the requested packet for transmission in the send queues (406, 408). If so, then the retry analysis determines that the retry request is inappropriate and it will not honor the request. More generally stated, this source factor seeks to determine whether the source module 202 (or some other entity) is already "planning" to send the missing packet.

(Source Factor c) Has the requested packet recently been transmitted by the source module? The retry analysis performed by the source-side algorithm functionality 410 determines whether the source module 202 (or some other entity) has recently transmitted the requested packet to the target module 206 using any delivery mechanism, including a repeater-type delivery mechanism described in subsection A.4 below. If so, then the retry analysis determines that the retry request is inappropriate and it will not honor the request.

(Source Factor d) Can the requested packet be delivered to the target module on time? The retry analysis performed by the source-side algorithm functionality 410 determines whether the source module 202 can transmit the requested packet to the target module 206 by a time that the target module 206 is scheduled to perform some action on the requested packet. If not, then the retry analysis determines that the retry request is inappropriate and it will not honor the request.

For example, the source-side algorithm functionality 410 can assess the time that the packet will be sent to the target module 206 by dividing the amount of bits in the packet by the bit rate of the communication channel 216 being used to transmit the stream 204, and then adding the resultant incremental time value to the present time. Next presume that the "deadline" time to be met is a time specified with respect to one of the delivery timeline, the presentation timeline, or the actual presentation timeline (note the grouping 222 of FIG. 2 for a graphical depiction of these timelines). The source-side algorithm functionality 410 can assess whether the packet can be delivered on time by comparing the calculated time with the selected deadline time. If the functionality 410 determines that the packet will be delivered too late to be of any use to the target module 206, it will not bother sending the packet. This helps reduce needless congestion in the communication channel 216 by eliminating useless retry activity.

(Source Factor e) Can the requested packet be delivered to the target module without exceeding prescribed bandwidth limitations? The retry analysis performed by the source-side algorithm functionality 410 determines whether the source module 202 can transmit the requested packet to the target module 206 in a manner which does not exceed bandwidth limitations associated with a communication channel 216. If this condition cannot be met, then the retry analysis determines that the retry request is inappropriate and it will not honor the request. As described above, the source module 202 can glean information regarding such prescribed bandwidth limitations from information previously transmitted to it by the target module 206, or from system configuration information fed to it in advance. The retry analysis can determine the incremental load that would be imposed by sending the requested packet using the type of analysis set forth in preceding paragraph.

Information regarding the bandwidth limitations allows the source module 202 to predict whether it can deliver the resource information on time. In other cases (such as variable bit rate cases), it may not be possible to provide a definitive determination of whether the available bandwidth will allow a packet to be delivered on time. In these cases, one solution is to discard a retry request once it is already too late for it to be of any use to the target module.

Figure 5:
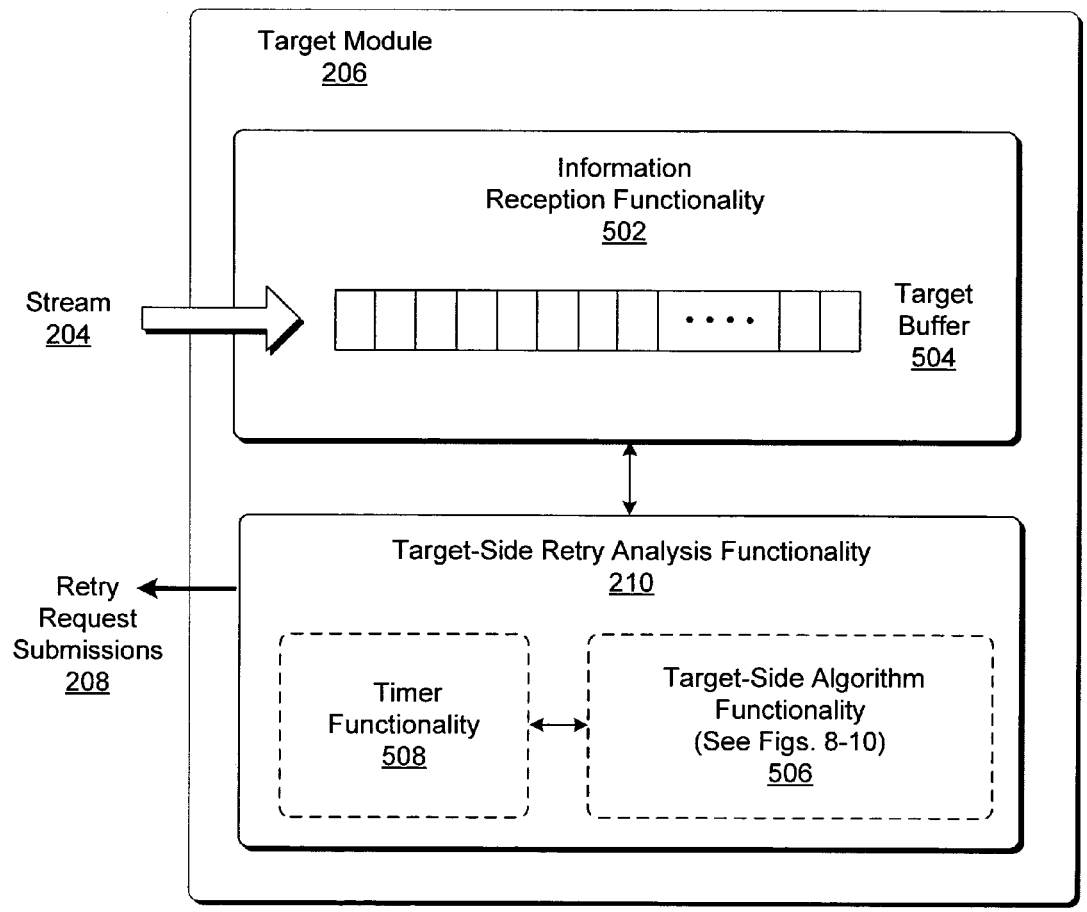
FIG. 5 shows an exemplary target module that can be used in the system of FIG. 2.

FIG. 5 shows more detail regarding the exemplary target module 206 introduced in the context of FIG. 2. The target module 206 includes information reception functionality 502 which performs the core tasks of receiving and decoding the stream resource information 204. The reception functionality can also perform the task of assessing whether there are missing ("lost") packets in the stream of received resource information. One way of making this assessment is by ordering the received packets according to their assigned sequence numbers. A discontinuity in sequence numbers constitutes, at least temporarily, a missing ("lost") packet. Such a lost packet, or grouping of plural lost packets, also defines a "hole" in the received stream of resource information 204. Another way that the information reception functionality 504 can assess the presence of lost packets is by determining that the packets have become corrupted during transmission, and are therefore considered effectively lost. One way to detect corruption is to compare checksum information provided in a field of the received packet with checksum information that is independently computed based on data in the received packet; a lack of agreement between these two checksum values indicates that the received packet has become corrupted.

More specifically, the information reception functionality 502 includes a buffer 504 for receiving a portion of the stream 204 prior to it being consumed by the decoder (not shown) of the target module 206. This buffer 504 is useful because it supplies some reserve of resource information in the event that there is a temporary interruption in delivery of resource information. The buffer 504 also complements the retry behavior of the system by giving the retry functionality: (a) a chance to identify lost packets prior to consumption of the resource information by the target module 206; and (b) a chance to remedy lost packets using retry requests prior to consumption of the resource information by the target module 206. However, there is a limited time in which the retry operation must be performed prior to the consumption of the resource information. Consumption of resource information with "holes" in it will lead to degraded output performance.

The target module 206 also includes the target-side retry analysis functionality 210 (introduced in the context of FIG. 2). The basic purpose of the target-side retry analysis functionality 210 is to perform analysis to determine whether it should send retry requests to the source module 202. If the target-side retry analysis functionality 210 determines that it should send these requests, it does so.

More specifically, the target-side retry analysis functionality 210 includes target-side algorithm functionality 506 for determining whether retry requests should be sent to the source module 202. The target-side algorithm functionality 506 can be implemented as hardware and/or software for performing prescribed analysis to determine whether to send the retry requests. The target-side algorithm functionality 506 may interact with timer functionality 508 in performing its analysis. Later figures (e.g., FIGS. 8, 9 and 10) describe the exemplary logic that can be used by the target-side algorithm functionality 504 in greater detail.

By way of summary, exemplary factors that can play a part in a determination of whether to send the retry requests can include any combination of the following exemplary and non-limiting factors:

(Target Factor a) Has there been a predetermined period of time since a prior retry request? The retry analysis performed by the target-side algorithm functionality 506 determines whether there has been a predetermined time since a prior retry request. This can be assessed by determining whether a retry timer has expired. If the predetermined time has not yet expired, then the retry analysis determines that the retry request is inappropriate and it will not send the request.

(Target Factor b) Has there been a recent response to a prior retry request from the source module? The retry analysis performed by the target-side algorithm functionality 506 determines whether there has been a recent response by the source module 202 to one of the target module 206's prior retry requests. If a recent response has been received, then the retry analysis determines that the retry request is inappropriate and it will not send the request. More specifically, the target-side algorithm functionality 506 can be configured to reset the above-identified retry timer upon receipt of a retry packet.

(Target Factor c) Has the target module received a response to a retry request that does not pertain to an earliest identified lost packet, without then timely receiving a yet earlier lost packet? In one exemplary implementation, this query can be formulated as: Has a predetermined amount of time elapsed since receiving a response to a prior retry request from the source module that pertains to a lost packet which is not the earliest identified lost packet and which is the earliest lost packet received since last requesting any retries or receiving an earliest identified lost packet? Namely, in this implementation, the retry analysis performed by the target module determines whether a predetermined amount of time has elapsed since receiving a response to a prior retry request that pertains to a lost packet which is the earliest packet received during the predetermined amount of time, but the lost packet is not the earliest packet that has been identified as being lost. If this is the case, then the retry analysis determines that the retry request is appropriate at least for any lost packets that occur before the earliest packet received during the predetermined amount of time. The target-side retry analysis functionality 210 can implement this feature using two timers, as will be described below.

(Target Factor d) Has the source module previously indicated that it will not supply the lost packet? The retry analysis performed by the target-side algorithm functionality 506 determines whether the source module 202 has previously indicated that it will not supply the lost packet. If this is the case, then the retry analysis determines that the retry request is inappropriate and it will not send the request. More specifically, the source module 202 may communicate that it will not satisfy a retry request for packet M; the target-side algorithm functionality 506 can interpret this refusal as not only preventing it from obtaining packet M from the server module 202, but also any packet having sequence numbers prior to packet M.

(Target Factor e) Can the source module deliver the lost packet in time? The retry analysis performed by the target-side algorithm functionality 506 can determine whether the source module 202 can possibly deliver the lost packet by a time that the target module 206 is scheduled to perform some action of the lost packet. If this is not the case, then the retry analysis determines that the retry request is inappropriate and it will not send the request. The target module 206 can basically perform the same analysis that the source module 202 uses to make this determination, with possible extra allowance for whatever time is required to transmit the retry request to the source module 202.

A.3. Exemplary Reporting Formats

The target module 206 can express the retry request in different possible formats. Recall the terminology developed above in which one or more adjacent lost packets define a "hole" in the stream of resource information. A first exemplary reporting format describes this hole by providing information which identifies the start and end of the hole. A second exemplary reporting format defines one or more holes by providing information which identifies one boundary of a first hole in combination with a mask of defined size which describes missing packets that make up subsequent holes that are within the mask size of the first hole.

More specifically, the first format involves performing the following steps to describe the hole: (a) get the sequence number of the last packet to arrive in sequence; (b) get the sequence number of the last non-present packet; (c) if the target module 206 is aware of a data rate restriction, e.g., regarding the capacity of the communication channel 216 (e.g., 220+218), specify what data rate the source module 202 should use when transmitting packets to the target module 206.

The second format involves performing the following steps to describe the hole: (a) get the sequence number of the last packet to arrive in sequence; (b) pick a length to signal the retry over (e.g., maximum of 32 in one exemplary and non-limiting application); (c) create a bit mask of the same length, fill it with a zero for packets that have not yet arrived, and fill it with a one for packets that have arrived; and (d) if the target module 206 is aware of a data rate restriction (e.g., regarding the capacity 220+218), specify what data rate the source module 202 should use when transmitting packets to the target module 206.

These two formats are merely illustrative. There are other ways to describe a hole in the stream of resource information 204. As a general feature, however, note that both of the two reporting format described above allow the target module 206 to report a plurality of lost packets in a single retry request to the source module 202.

The target-side retry analysis functionality 210 can be configured to determine which one of a plurality of possible reporting formats makes the best sense for a given retry scenario, and then to formulate the retry request in the selected reporting format. Namely, one format may be superior to the others because, given the nature of the holes (e.g., the extent of the holes and/or the distribution of lost packets), one reporting format may be more efficient than another. For instance, one reporting format may be superior to another because it is more compact than another for reporting the same set of holes, and therefore may require less bandwidth to transmit. The preferred reporting format can vary as time progresses; for instance, a set of holes having an initial character may warrant the use of a first kind of reporting format, but after some of the lost packets have been filled in, the set of holes may develop a character that warrants the use of another kind of reporting format. The source module 202 is configured to interpret any one of the possible formats that can be used.

FIG. 6 shows two examples of different arrangements of holes within a segment of resource information contained the target module 206's buffer 504. Consider example No. 1. This hole is relatively large: everything between packet No. 1 and packet No. 9 is missing. In this case, there is no clear advantage to either of the formats discussed above since all missing packets fit within one retry request with either exemplary retry request format. If the hole were larger than the maximum mask size supported by a particular implementation, the first format described above would provide a more compact description of the missing packets in example No. 1.

Consider, however, example No. 2. Here, there are four separate holes between packet No. 1 and packet No. 10. Using the first format described above, each of these holes would need to be specified separately, requiring a total of four separate retry requests. But in the second format, the entire span from packet No. 1 to packet No. 10 can be encoded as one retry request, and a mask can be used to indicate the specific missing packets. In terms of economy of requests, the second format appears to be superior to the first format to describe the missing packets in example No. 2.

Whatever report format is used, the retry analysis functionality 210 can send the retry requests over various kinds of transport, such as HTTP, web-enabled endpoint, TCP, UDP, SOAP over HTTP/TCP/UDP, and so forth. The data within the retry requests can be encoded within CGI parameters in a Universal Resource Locator (URL), as a chunk of Extensible Markup Language (XML) information, or using some other technique. Multiple retry requests may be sent using a single lower-level protocol exchange, such as a single URL, a single XML string, a single UDP packet, and so forth.

A.4. Exemplary Variations for Multiple Entities in the Resource Information Delivery Chain The examples developed above pertain primarily to the case where a source module delivers resource information to a target module, and also handles retry requests issued by the target module. But, as noted with respect to FIG. 2, a source module may act as an intermediary, receiving resource information from another source module and forwarding it to a target module (which may, in turn, comprise a source module with respect to another target module). In this setup, special provisions may apply for handling retries.

Consider, for example, the case where the source module acts as the above-described multicast repeater. In this role, the source module acts as an intermediary by receiving multicast resource information from a source and forwarding it to the target module. Namely, the repeater source module can listen to a multicast stream on one address and optionally forward the multicast stream as another multicast on a different address. When the intermediary source module misses a multicast packet, upon a successful retry arriving from the source, the repeater source module can forward the packet as multicast instead of having to shuttle the resource information down in unicast fashion to each downstream target module. In other words, when the repeater source module misses a multicast packet, it makes a (unicast) retry request to the original source, and, upon receipt of the lost packet, sends the retry packet out in multicast fashion. This assumes that the network topology is such that, if the repeater source module misses the packet, its downstream target modules will miss the packet as well. This also assumes that the bulk data delivery is happening over multicast.

This configuration may also warrant various modifications to the retry analysis described above. Consider the case of Source Factor b, in which the source module determines whether a retry request should be ignored based on whether it (or some other entity) is already "planning" to send the associated missing packet to the target module. Consider also the case of Source Factor c, in which the source module determines whether a retry request should be ignored based on whether it (or some other entity) has just sent the missing packet. In the multicast repeater configuration described above, the source module that acts as a repeater may have already requested the missing packet from its own source. Or the source module (or some other entity) may have already sent the missing packet to the target module via the multicast mechanism (or some other mechanism). In both of these circumstances, the source module can ignore any independent retry requests for the missing packet generated by the downstream target module. The general philosophy of this feature is that, if the source module (or other entity) is already in the process of tending to the missing packet (or has already successfully tended to it), it will not need to separately address a downstream module's requests for the missing packet. This reduces the potential of double-transmission of missing packets. Similar modifications to the retry analysis can be made for delivery chains that use other kinds of delivery mechanisms to propagate the resource information down the chain (e.g., other than multicast repeater-type delivery).

A.5. Exemplary Variations for Handling Retry During Startup

The examples developed above assume that a source module has been streaming resource information to a target module for an extended period of time (which may be characterized as a "steady-state" condition). A system will exhibit such steady-state condition throughout the great majority of the streaming operation. At other times, however, the system departs from such steady-state condition. One such occasion corresponds to the start of the stream, that is, when the source module first begins to send packets to the target module. During this time, the target module starts receiving the packets at some location in the stream. But the target module will not generally have any prior "knowledge" of what this starting point might be. This raises various challenges to the retry analysis described above, as the target module is not in a good position to determine whether it has missed one or more initial packets transmitted by the source module.

One way of addressing this concern is to apply the retry analysis described above in unmodified form. This may potentially result in the failure to optimally perform retry analysis during the start of the stream. In another approach, the source module (or some other entity) can alert the target module upon the start of a streaming operation of the identity of one or more initial packets that it will receive upon the start of the stream. One way of identifying the initial packet(s) is to identify the sequence number(s) associated with the initial packet(s). The source module (or other entity) can forward this information to the target module using any communication route, including an inband communication route or an out-of-band communication route. Different technical environments may or may not be able to accommodate this variation. An environment in which it is not possible to gain advance knowledge of the initial packet (s) cannot accommodate this provision (which may be the case in some forms of multicast delivery). In unicast delivery, on the other hand, the source module (or some other entity) should be able to readily furnish information regarding the initial packet(s) to the target module. In those environments where the target module can essentially be "preloaded" with information regarding one or more initial packets, it can use this information to determine whether it has failed to receive these packets. This results in more reliable retry behavior during the startup of the stream.

The system can rely on similar provisions at other junctures during the streaming operation (besides the start of the stream), such as when the steam has been interrupted for some reason and is then re-established. More generally stated, if possible, the system can send information to the target module in any anomalous situation (where the sequence numbers of the packets may not conform, for any reason, to a "usual" expected sequence), to give the target module information regarding packets that it will receive (or will not receive). Again, this provision results in more reliable retry behavior during these events, e.g., by better ensuring that appropriate retries are sent and inappropriate retries are not sent.

B. Exemplary Method of Operation

FIGS. 7-10 describe the operation of the system of FIG. 2 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

B.1. Server-Based Retry Analysis

Figure 7:
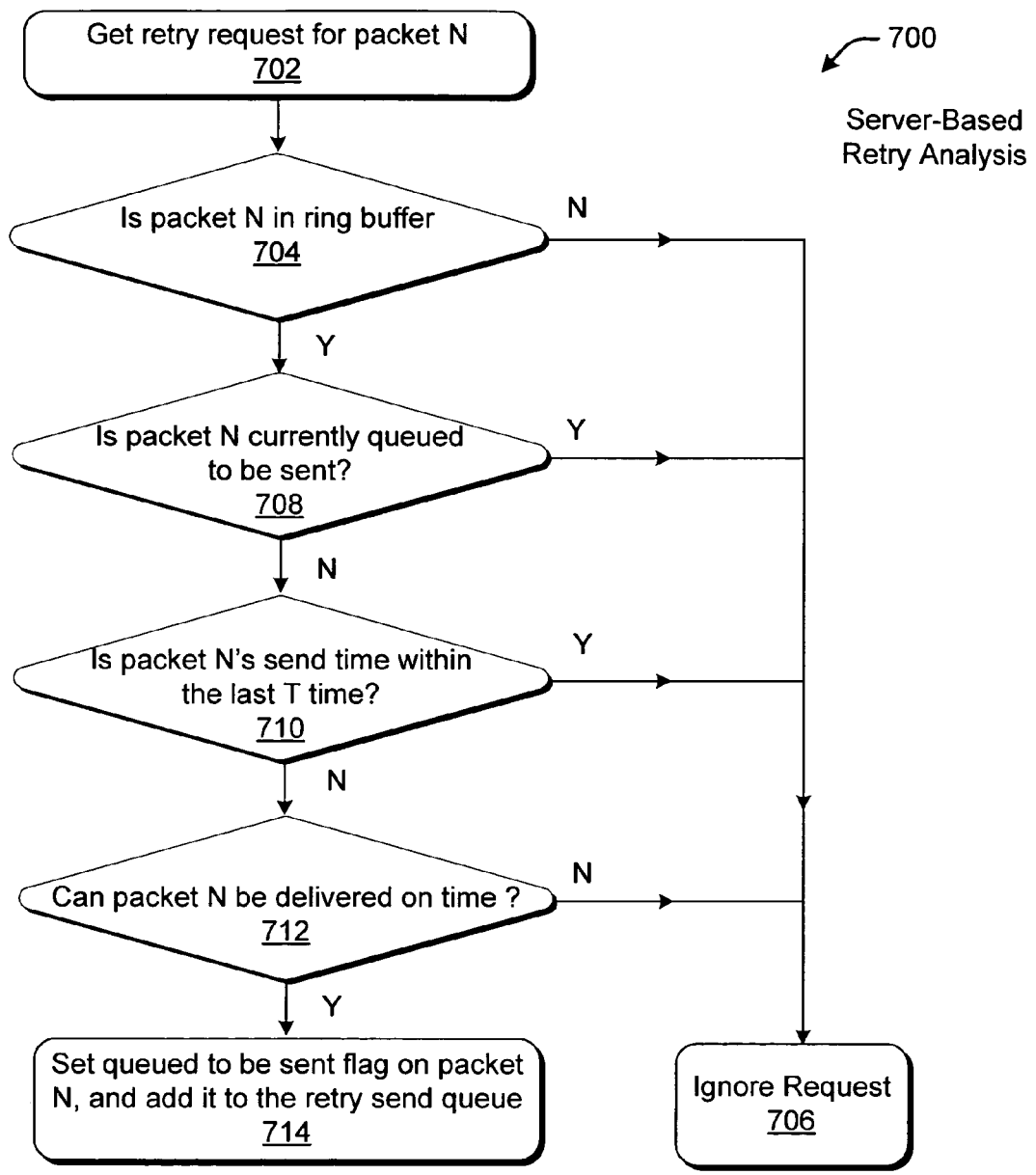
FIG. 7 shows an exemplary procedure that can be used by the source module of FIG. 4 to implement the retry analysis, which determines the appropriateness of sending retry packets to the target module.

FIG. 7 describes a procedure 700 that can be implemented by the source-side algorithm functionality 410 introduced in FIG. 4. By way of overview, this procedure 700 determines whether to satisfy retry requests transmitted by the target module 206. As the operations identified in this procedure 700 have already been described in Section A, this subsection will serve primarily as a review.

To begin with, step 702 indicates the receipt of a retry request from the target module 206. Assume that the retry request conveys the fact that packet number N is missing. (As noted, a typical retry request can convey the fact that multiple packets are lost, but, for the sake of simplicity, the following discussion will assume that only a single packet has been lost. The analysis for the case of a single packet can be extended to the case of multiple lost packets by performing the same analysis for other packets in the retry request).

Step 704 determines whether the packet N is in the ring buffer 404. If not, then the retry request is ignored, as per step 706.

Step 708 determines whether the packet N is currently queued to be sent in one of the send buffers (406, 408) to the target module 206. If so, then the retry request is ignored, as per step 706 (because the packet is going to be sent anyway).

Step 710 determines whether the packet N was only recently sent. This can be assessed by comparing the current time to the "last time sent" information provided in the ring buffer 404, and determining whether the difference is below a prescribed time interval. If step 710 determines that the packet has only been recently sent, then the retry request is ignored, as per step 706 (because the packet may have been en route to the target module 206 when it generated the retry request).

Step 712 determines whether packet N can be delivered on time. This can be assessed by computing the amount of time required to transmit the packet (based on the amount of bits in the packet and the data rate of the stream used to send the packet), and adding this incremental time to the current time. The deadline time to satisfy can be expressed with reference to any one of the timelines 222 (delivery, presentation, actual presentation) shown in FIG. 2. If step 712 determines that the packet N cannot be delivered on time, then the retry request is ignored, as per step 706.

Finally, if none of the disabling circumstances in steps 704, 708, 710, or 712 are present, then step 714 sets the "queued to be sent" flag for packet N in the ring buffer 402, and adds a reference to packet N in the retry send queue 408. This will prompt the source module 202 to re-send packet N in due course (e.g., when the send thread next reads the retry queue 408). (In another implementation, the main ring buffer can be shared by plural target modules. In this configuration, the retry processing can involve efficiently checking the retry queue for a packet before adding it to the retry queue again. This can take the place of "checking the queued to be sent flag." For purposes of determining whether to perform a retry, a packet can go directly from the retry queue, which is not inherently queued to be sent, to the "recently sent" state.)

B.2. Client-Based Retry Analysis

Figure 8:
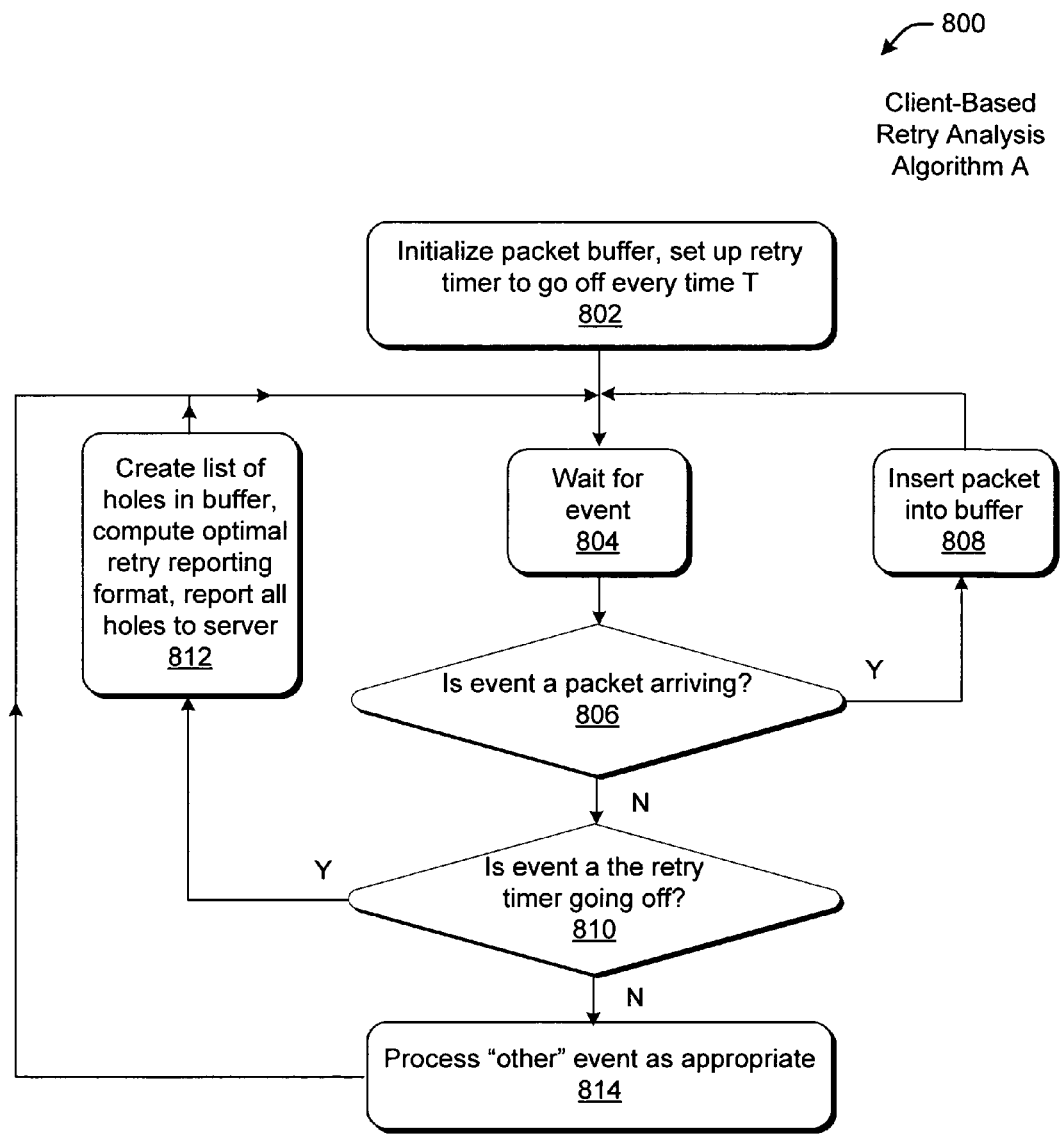
FIG. 8 shows an exemplary procedure that can be used by the target module of FIG. 5 to implement the retry analysis, which determines the appropriateness of sending retry requests to the source module.
Figure 9:
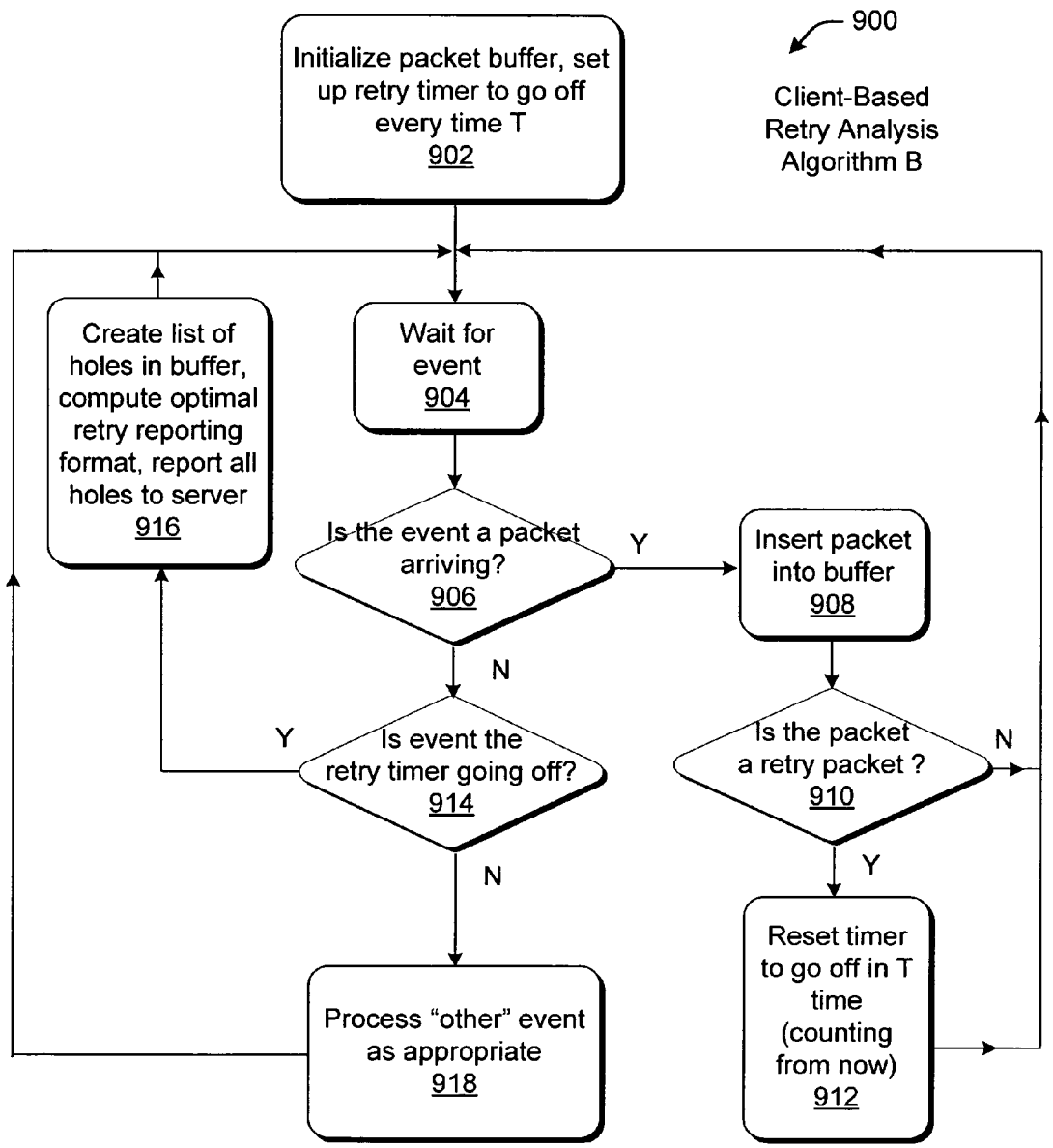
FIG. 9 shows another exemplary procedure that can be used by the target module of FIG. 5 to implement the retry analysis.

FIGS. 8-10 describe three different procedures (800, 900, 1000) that the target-side algorithm functionality 506 can use to determine whether to send a retry request to the source module 202. Again, since the operations identified in these procedures have already been described in Section A, this subsection will serve primarily as a review.

FIG. 8 employs the least complex analysis. Step 802 of the procedure 800 initializes the buffer 504 of the target module 206, and sets up a retry timer to go off after a prescribed time T (which may comprise a certain number of milliseconds, for instance).

Step 804 involves waiting for an event. If an event is received, step 806 determines whether the event corresponds to the arrival of a packet. If so, step 808 involves storing the received packet in the buffer 504.

If the event is not the arrival of a packet, step 810 determines whether the event corresponds to the expiration of the retry timer. If so, step 812 involves creating a list of holes in the buffer 504, computing an optimal reporting format to report the holes, and then sending one or more retry requests which report the holes.

Step 814 corresponds to a catch-all operation which addresses any other action appropriate to the detected event when the detected event corresponds to neither the arrival of a packet nor the expiration of the retry timer.

FIG. 9 shows a procedure 900 that adds further sophistication to the analysis shown in FIG. 8. Step 902 of the procedure 900 initializes the buffer 504 of the target module 206, and sets up the retry timer to go off after a prescribed time T.

Step 904 involves waiting for an event. If an event is received, step 906 determines whether the event corresponds to the arrival of packet. If so, step 908 involves storing the received packet in the buffer 504. Then, unlike the case of FIG. 8, step 910 determines whether the received packet corresponds to a retry packet. And if so, step 912 involves resetting the retry timer (and activating the timer to start counting down). This operation has the effect of delaying the reporting of the holes to the source module 202 based on the philosophy that the arrival of the retry packet may indicate that the source module 202 is already in the process of satisfying lost packets (which may have the effect of eliminating the need for additional retry requests for these packets).

The remainder of the procedure 900 is the same as procedure 800. Namely, if the event is not the arrival of a packet, step 914 determines whether the event corresponds to the expiration of the retry timer. If so, step 916 involves creating a list of holes in the buffer 504, computing an optimal reporting format to report the holes, and then sending one or more retry requests which report the holes.

Step 918 corresponds to a catch-all operation which addresses any other action appropriate to the detected event when the detected event corresponds to neither the arrival of a packet nor the expiration of the retry timer.

FIG. 10 shows a procedure 1000 that adds further sophistication to the analysis shown in FIG. 9. Step 1002 of the procedure 1000 initializes the buffer 504 of the target module 206, sets up a generic retry timer to go off after a prescribed time interval T, and sets up another one-time missed retry timer (but does not trigger this timer yet). This step 1002 further creates an "earliest retry" variable and initializes this variable to the value null.

Step 1004 involves waiting for an event. If an event is received, step 1006 determines whether the event corresponds to the arrival of packet. If so, step 1008 involves storing the received packet in the buffer 504. Step 1010 then determines whether the received packet corresponds to a retry packet. If so, then, unlike the case of procedure 900, procedure 1000 involves the further step 1012 of determining whether the retry packet is the earliest retry packet that is expected. Namely, assume that the target module 506 has previously sent retry requests for lost packet Nos. 3, 5, 8 and 10; in this example, the earliest retry packet expected is packet No. 3. If, in fact, the received retry packet corresponds to the earliest packet expected, then step 1014 involves canceling the missed retry timer (if it is active) and setting the "earliest retry" variable to null, and step 1016 involves resetting the generic retry timer to expire in time T (and activates this timer to start counting down).

But assume that the query in step 1012 is answered in the negative, meaning that the retry packet that has been received is not the earliest packet that was expected. In this case, step 1018 is invoked, which determines whether the "earliest retry" variable is currently set to null, or is larger than the current packet. If so, step 1020 sets the "earliest retry" variable equal to the current packet, and step 1022 sets the missed retry timer to expire in U amount of time (and activates this counter to start counting down). This is followed by also resetting the generic timer in step 1016. More intuitively stated, these series of steps have the effect of preparing the target module 206 to report holes so long as these holes appear prior in sequence to a received retry packet. In other words, say that target module 206 receives a retry packet for packet No. 5, but not an earlier packet No. 3. This might suggest that the retry request for packet No. 3 never reached the source module 202, or the retry packet for packet No. 3 was itself lost en route to the target module 206; and as such, the target module 206 is entitled to generate another retry request for packet No. 3, providing that this deficiency is not remedied by the time that the missed retry timer or generic timer goes off.

The remainder of the procedure 1000 is similar to the previous procedures, except for the inclusion of two timer events. Namely, if the event is not the arrival of a packet, step 1024 determines whether the event corresponds to the expiration of the generic retry timer. If so, step 1026 involves creating a list of holes in the buffer 504, computing an optimal reporting format to report the holes, and then sending one or more retry requests which report the holes. Also, step 1026 cancels the missed retry timer, if active, and sets the "earliest retry" variable to null. If the event does not pertain to the generic retry timer, step 1028 involves determining whether the event corresponds to the expiration of the missed retry timer. If so, step 1030 involves creating a list of holes in the buffer 504 before the "earliest retry" variable, computing an optimal reporting format to report the holes, and then sending one or more retry requests which report the holes. Step 1030 also implicitly cancels the missed retry timer because it went off and shouldn't continue going off. Also, step 1030 sets the "earliest retry" variable to null.

Steps 1026, 1030, and 1014 each cancel the missed retry timer and set the "earliest retry" variable to null. Those skilled in the art will recognize that these two sub-steps may be combined into a single sub-step (e.g., by combining the two sub-steps into a single computer language "function" or the like).

Step 1032 corresponds to a catch-all operation which addresses any other action appropriate to the detected event when the detected event corresponds to neither the arrival of a packet nor the expiration of one of the timers.

C. Exemplary Computer Environment

Figure 11:
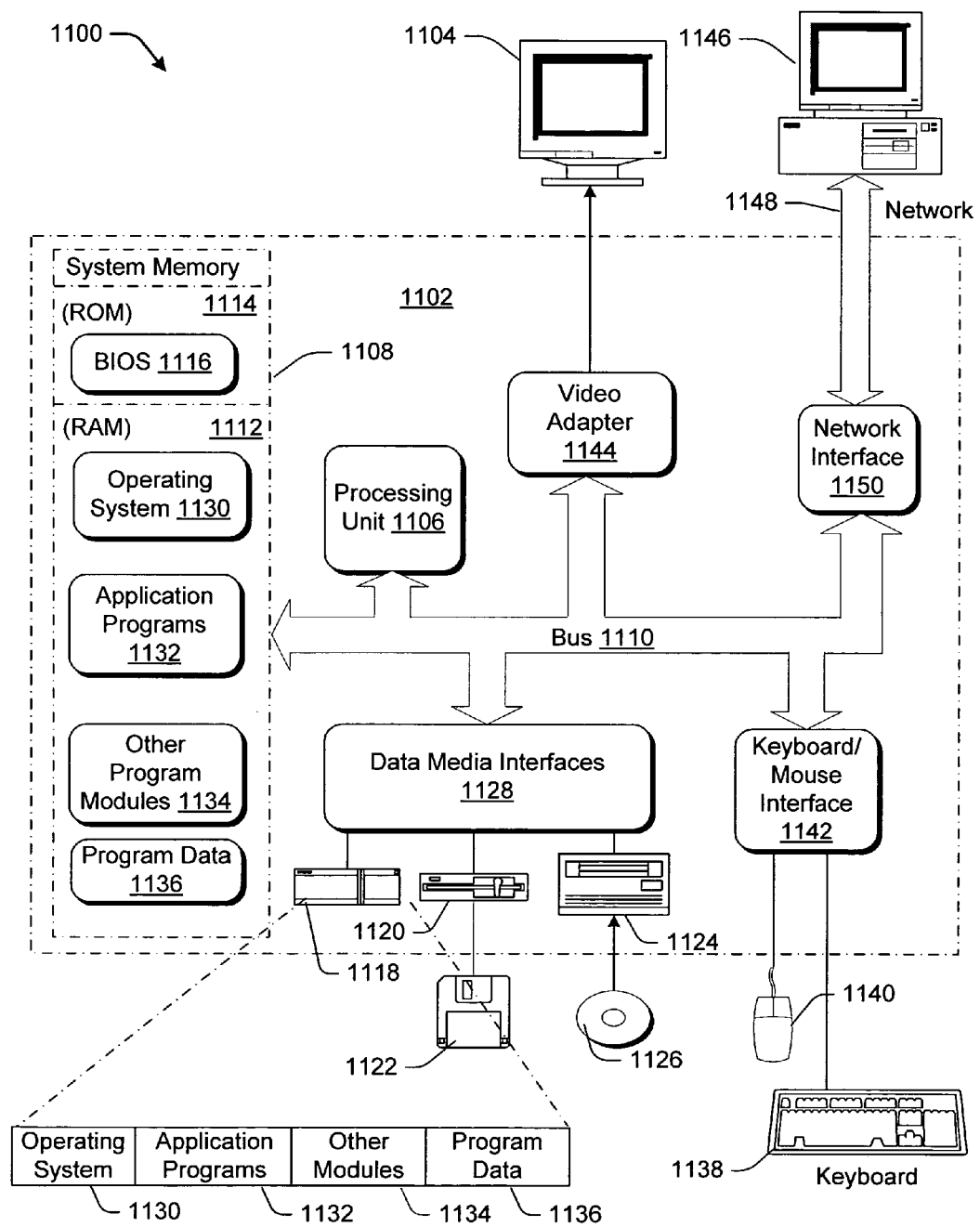
FIG. 11 shows an exemplary computer environment for implementing aspects of the system shown in FIG. 2.

In one exemplary implementation, certain aspects of the source module 202 and/or the target module 206 can be implemented by respective computer devices. In this case, FIG. 11 provides information regarding an exemplary computer environment 1100 that can be used to implement such computer devices.

The computing environment 1100 includes a general purpose or sever type computer 1102 and a display device 1104. However, the computing environment 1100 can include other kinds of computing equipment. For example, although not shown, the computer environment 1100 can include hand-held or laptop devices, set top boxes, game consoles, mainframe computers, etc. Further, FIG. 11 shows elements of the computer environment 1100 grouped together to facilitate discussion. However, the computing environment 1100 can employ a distributed processing configuration. In a distributed computing environment, computing resources can be physically dispersed throughout the environment.

Exemplary computer 1102 includes one or more processors or processing units 1106, a system memory 1108, and a bus 1110. The bus 1110 connects various system components together. For instance, the bus 1110 connects the processor 1106 to the system memory 1108. The bus 1110 can be implemented using any kind of bus structure or combination of bus structures, including a memory bus or memory controller, a peripheral bus, an accelerated graphics port, and a processor or local bus using any of a variety of bus architectures.

Computer 1102 can also include a variety of computer readable media, including a variety of types of volatile and non-volatile media, each of which can be removable or non-removable. For example, system memory 1108 includes computer readable media in the form of volatile memory, such as random access memory (RAM) 1112, and non-volatile memory, such as read only memory (ROM) 1114. ROM 1114 includes an input/output system (BIOS) 1116 that contains the basic routines that help to transfer information between elements within computer 1102, such as during start-up. RAM 1112 typically contains data and/or program modules in a form that can be quickly accessed by processing unit 1106.

Other kinds of computer storage media include a hard disk drive 1118 for reading from and writing to a non-removable, non-volatile magnetic media, a magnetic disk drive 1120 for reading from and writing to a removable, non-volatile magnetic disk 1122 (e.g., a "floppy disk"), and an optical disk drive 1124 for reading from and/or writing to a removable, non-volatile optical disk 1126 such as a CD-ROM, DVD-ROM, or other optical media. The hard disk drive 1118, magnetic disk drive 1120, and optical disk drive 1124 are each connected to the system bus 1110 by one or more data media interfaces 1128. Alternatively, the hard disk drive 1118, magnetic disk drive 1120, and optical disk drive 1124 can be connected to the system bus 1110 by a SCSI interface (not shown), or other coupling mechanism. Although not shown, the computer 1102 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1102. For instance, the readable media can store the operating system 1130, application-specific functionality 1132, other program modules 1134, and program data 1136.

The computer environment 1100 can include a variety of input devices. For instance, the computer environment 1100 includes the keyboard 1138 and a pointing device 1140 (e.g., a "mouse") for entering commands and information into computer 1102. The computer environment 1100 can include other input devices (not illustrated), such as a microphone, joystick, game pad, satellite dish, serial port, scanner, card reading devices, digital or video camera, etc. Input/output interfaces 1142 couple the input devices to the processing unit 1106. More generally, input devices can be coupled to the computer 1102 through any kind of interface and bus structures, such as a parallel port, serial port, game port, universal serial bus (USB) port, etc.

The computer environment 1100 also includes the display device 1104. A video adapter 1144 couples the display device 1104 to the bus 1110. In addition to the display device 1104, the computer environment 1100 can include other output peripheral devices, such as speakers (not shown), a printer (not shown), etc.

Computer 1102 operates in a networked environment using logical connections to one or more remote computers, such as a remote computing device 1146. The remote computing device 1146 can comprise any kind of computer equipment, including a general purpose personal computer, portable computer, a server, etc. Remote computing device 1146 can include all of the features discussed above with respect to computer 1102, or some subset thereof.

Any type of network 1148 can be used to couple the computer 1102 with remote computing device 1146, a LAN, etc. The computer 1102 couples to the network 1148 via network interface 1150, which can utilize broadband connectivity, modem connectivity, DSL connectivity, or other connection strategy. Although not illustrated, the computing environment 1100 can provide wireless communication functionality for connecting computer 1102 with remote computing device 1146 (e.g., via modulated radio signals, modulated infrared signals, etc.).

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

Moreover, a number of features were described herein by first identifying exemplary problems that these features can address. This manner of explication does not constitute an admission that others have appreciated and/or articulated the problems in the manner specified herein. Appreciation and articulation of the problems present in the media streaming art are to be understood as part of the present invention. More specifically, there is no admission herein that the features described in the Background section of this disclosure constitute prior art.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for streaming resource information from a source module to a target module, comprising:

sending a stream of resource information from the source module to the target module;

receiving a retry request from the target module which indicates that the target module has failed to receive at least one packet within the stream of resource information, the target module being configured to pick a packet sequence length to send the retry request over, and wherein the target module is configured to pick the packet sequence length from a plurality of packet sequence lengths, each of the plurality of packet sequence lengths containing a variable numbers of packets;

applying retry analysis to determine whether to send the target module said at least one missing packet in response to the retry request, wherein the retry analysis determines whether to send said at least one missing packet by determining whether said at least one missing packet remains in a buffer maintained by the source module; and sending the target module said at least one missing packet if the retry analysis confirms that said at least one missing packet should be sent.

2. The method of claim 1, wherein the retry analysis further determines whether to send the target module said at least one missing packet in response to the retry request by determining whether said at least one missing packet is already planned to be sent, and determining that the request is not appropriate when said at least one missing packet is already planned to be sent.

3. The method of claim 1, wherein the retry analysis further determines whether to send the target module said at least one missing packet in response to the retry request by determining whether said at least one missing packet has recently been sent via any delivery mechanism, and determining that the request is not appropriate when said at least one missing packet has recently been sent.

4. The method of claim 1, wherein the retry analysis further determines whether to send the target module said at least one missing packet in response to the retry request by determining whether said at least one missing packet can be delivered to the target module by a time that the target module is scheduled to perform some action on said at least one missing packet, and determining that the request is not appropriate when said at least one missing packet cannot be delivered by this time.

5. The method of claim 1, wherein the retry analysis further determines whether to send the target module said at least one missing packet in response to the retry request by determining whether said at least one missing packet can be delivered to the target module in a manner which does not exceed bandwidth limitations associated with a communication channel that couples the source module to the target module, and determining that the request is not appropriate when said at least one missing packet cannot be delivered according to such limitations.

6. The method of claim 1, wherein said at least one missing packet defines a hole in the stream of resource information, and wherein the retry request identifies the hole by providing information which identifies the start and end of the hole.

7. The method of claim 1, wherein said at least one missing packet defines at least one hole in the stream of resource information, and wherein the retry request identifies said at least one hole by providing information which identifies one boundary of the at least one hole in combination with a mask of defined size which describes missing packets within said at least one hole.

8. One or more machine-readable media storing machine-readable instructions that when executed implement the method of claim 1.

9. A source module including: one or more machine-readable media storing machine-readable instructions that when executed by the source module cause the source module to implement the method of claim 1.

10. A method for receiving steaming resource information by a target module from a source module, comprising:

receiving a stream of resource information by the target module having a plurality of packets;

determining whether a of the packets within the stream of resource information is missing;

applying retry analysis to determine whether to send at least one retry request to the source module to request the source module to send said at least one missing packet, wherein the retry analysis determines whether to send the retry request for said at least one missing packet by determining whether the source module has previously indicated that it will not supply said at least one missing packet, the target module being configured to pick a packet sequence length to send the retry request over, and wherein the target module is configured to pick the packet sequence length from a plurality of packet sequence lengths, each of the plurality of packet sequence lengths containing a variable numbers of packets; and sending the source module the retry request if the retry analysis confirms that the retry request should be sent.

11. The method of claim 10, wherein the retry analysis further determines whether to send a retry request by determining whether there has been a predetermined period of time since a prior retry request, and determining that the retry request is not appropriate when the predetermined period of time has not been reached.

12. The method of claim 10, wherein the retry analysis further determines whether to send a retry request by determining whether there has been a recent response from the source module to a prior retry request, and determining that the retry request is not appropriate when there has been such a recent response.

13. The method of claim 10, wherein the retry analysis further determines whether to send a retry request by determining whether (a) there has been a response from the source module to a prior retry request that does not pertain to an earliest expected missing packet, and (b) thereafter, a yet earlier missing packet is not received within a predetermined amount of time, and, if conditions (a) and (b) are met, determining that the retry request is appropriate for said at least one missing packet that is earlier in a sequence of packets than a packet associated with the response from the sewer module.

14. The method of claim 10, wherein the retry analysis further determines whether to send a retry request to the source module to request the source module to send said at least one missing packet by determining whether said at least one missing packet can be delivered by the source module by a time that the target module is scheduled to perform some action on said at least one missing packet, and determining that the request is not appropriate when said at least one missing packet cannot be delivered by this time.

15. The method of claim 10, wherein said at least one missing packet defines a hole in the stream of resource information, and wherein the retry request identifies the hole by providing information which identifies the start and end of the hole.

16. The method of claim 10, wherein said at least one missing packet defines at least one hole in the stream of resource information, and wherein the retry request identifies said at least one hole by providing information which identifies one boundary of said at least one hole in combination with a mask of defined size which describes missing packets within the at least one hole.

17. One or more machine-readable media storing machine-readable instructions that when executed implement the method of claim 10.

18. A target module including: one or more machine-readable media storing machine-readable instructions that when executed by the target module cause the target module to implement the method of claim 10.

* * * * *